(12) United States Patent
Metz

(10) Patent No.: US 7,217,185 B2
(45) Date of Patent: May 15, 2007

(54) VENTILATING SYSTEM

(75) Inventor: Peter Metz, Freimersheim (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 80 days.

(21) Appl. No.: 10/505,515

(22) PCT Filed: Feb. 21, 2003

(86) PCT No.: PCT/EP03/01841

§ 371 (c)(1),
(2), (4) Date: Feb. 7, 2005

(87) PCT Pub. No.: WO03/072379

PCT Pub. Date: Sep. 4, 2003

(65) Prior Publication Data
US 2005/0136823 A1    Jun. 23, 2005

(30) Foreign Application Priority Data
Feb. 28, 2002 (DE) ............................. 102 09 074

(51) Int. Cl.
*B60H 1/34* (2006.01)

(52) U.S. Cl. ........................................... 454/155
(58) Field of Classification Search ................. 454/155
See application file for complete search history.

(56) References Cited

U.S. PATENT DOCUMENTS 5,733,191 A    3/1998   Lam et al.

FOREIGN PATENT DOCUMENTS

| DE | 34 07 670 A1 | 9/1984 |
| DE | 43 27 266 C1 | 8/1994 |
| DE | 44 03 096 A1 | 8/1995 |

*Primary Examiner*—Kenneth Rinehart
*Assistant Examiner*—Helena Kosanovic
(74) *Attorney, Agent, or Firm*—Leydig, Voit & Mayer, Ltd

(57) ABSTRACT

The invention relates to a ventilating system (1) for a dashboard (2) in a motor vehicle or similar. Said ventilation device comprises an airduct (3) for guiding air and an adjustment device (4) for directing air guided to the airduct. The adjusting device also comprises a outlets for discharging the flow of air into the passenger compartment of the motor vehicle. Said adjusting device is embodied in such a manner that in a first displacement state (a) thereof, the flow of air guided to the passenger compartment of the vehicle exits only from first outlets (6) and in a second displacement state (b) said air exits only through second outlets (7).

9 Claims, 3 Drawing Sheets

Figure 1A:
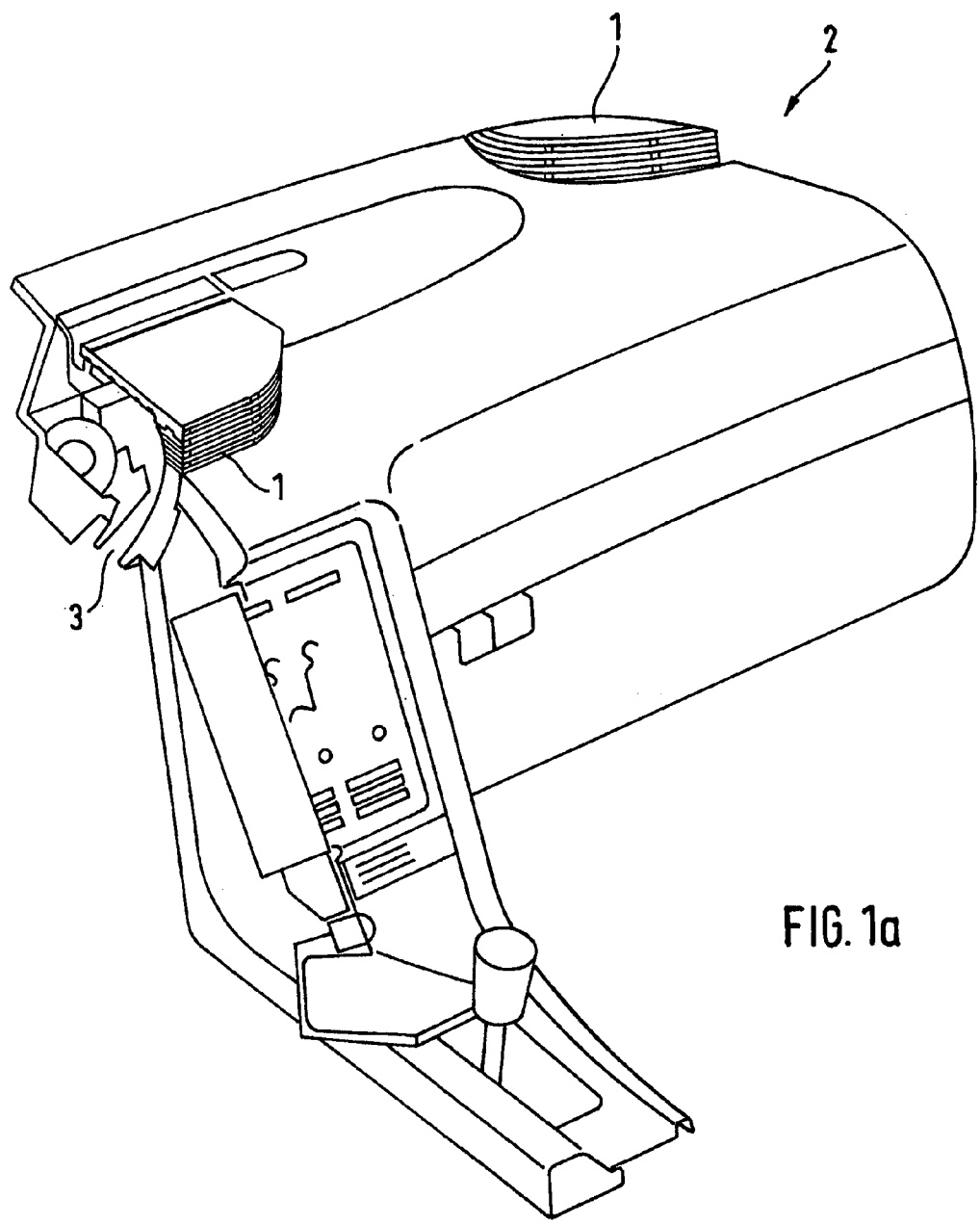

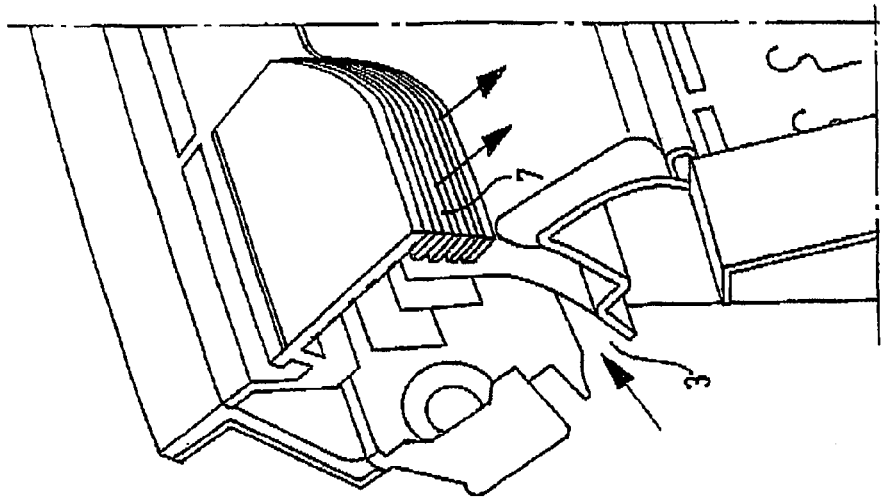
FIG.1c (condition b)
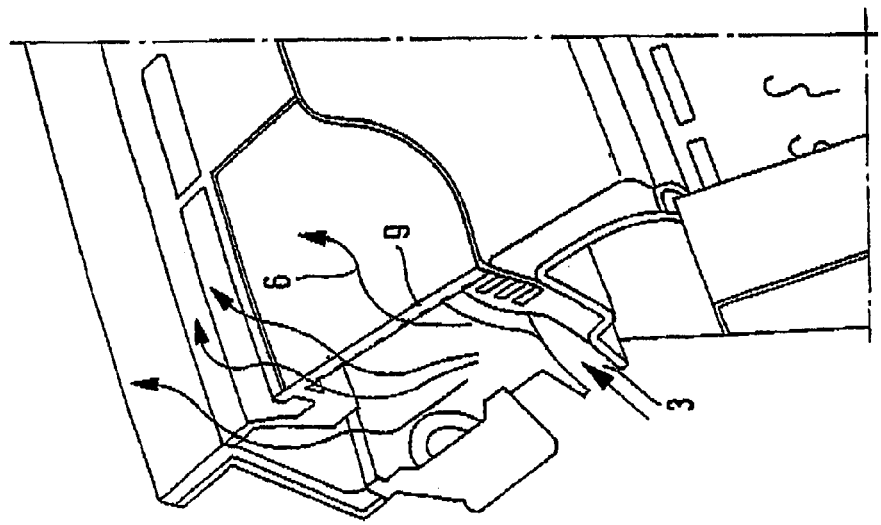
FIG.1b (condition a)

VENTILATING SYSTEM

This application is the U.S. national phase of international patent application PCT/EP03/01841, filed on Feb. 21, 2003, and claims priority to German patent application number 102 09 074.2, filed Feb. 28, 2002, all of which are hereby incorporated by reference.

The present invention relates to a ventilation means for an instrument panel of a motor vehicle or likewise. {PRIVAT}

Various demands are made on a ventilation means. Thus for example in the region below the windscreen, in motor vehicles, it is useful to provide a diffuse flow which does not flow directly onto the vehicle passengers. On the other hand it may be desirable to directly blow cold air onto the vehicle passengers, e.g. in summer, and warm air in winter.

Several concepts for ventilation means are known in order to fulfill these demands.

On the one hand it is possible to provide small-pored openings in an instrument panel for producing a diffuse flow. Additionally, apart from these, one may also provide lamella-like openings which by way of setting the inclination of the lamellae, produce an airflow running in the desired direction. The disadvantage of such an arrangement however lies in the fact due to this one requires relatively much space on the instrument panel and that because of this, in particular with modern expensive vehicles, surfaces elsewhere are very difficult to be able to be used (such as for large-surfaced screens of a navigation devices, etc).

For this reason the German published patent application DE 44 03 096 A1 suggests a different concept. Here, a single air duct for leading air is shown. At its exit cross section, the air duct is provided with an angled component which is mounted in an articulated manner and which is provided with flow-exit openings for the exit of the airflow into the inner space of a vehicle. In a first position, a plate of the angled component spans the exit cross section of the air duct so that a diffuse airflow may only escape through small openings in this plate. On folding out the angled component, a directed flow may escape through an open angle which is provided with lamellae.

Although this component has the feature that diffuse as well as a directed flow may escape from the same air duct, with a low space requirement, it is however a disadvantage that when the angular component is opened, apart from the directed flow, the flow through the small openings for producing a diffuse air layer continues to escape. An unordered flow pattern arises on account of this, the alignment of the airflow from the lamellae sections is disturbed (interrupted) and furthermore one requires unnecessarily strong ventilators which must produce the diffuse airflow which indeed is not required.

Proceeding from the disadvantages of these known ventilation means, it is the object of the present invention to create a ventilation means which on the one hand saves space and may be manufactured more economically, and on the other hand permits a strict separation between e.g. a purely directed airflow as well as a primarily diffuse airflow.

This object preferably is achieved by the characterizing features of the present invention. Advantageous embodiments and further developments of the solution will be apparent from the description of the invention provided herein.

By way of the fact that in a first movement condition of the adjustment means, the airflow directed towards the inside of the vehicle only flows out through first flow exit openings and in a second movement condition only through second flow exit openings, one achieves a clear separation between the flow types. Thus e.g. it is possible in the first movement condition to use flow exit openings of a smaller diameter for the through flow which produce a diffuse flow on the side of the vehicle interior. By way of changing the adjustment means into the second movement condition, one may then exclusively activate the second flow exit openings so that these (if they are designed lamella-like) permit an essentially directed flow.

At the same time the advantages of a space-saving arrangement and an inexpensive manufacturing possibility are retained in their complete scope, and no separate air ducts are necessary in order to produce the different flow types. The ventilation means remains compact and thus sufficient space remains for further means such as navigation means, etc.

A particularly advantageous embodiment envisages first flow exit openings for producing a diffuse flow on account of the nature of their openings, and second flow exit openings which are advantageously designed as openings between lamellae, for achieving a directed flow. It is of course also possible to provide both types of flow exit openings in each case with lamellae or in each case with holes having a small area.

A particularly advantageous further formation of the present invention envisages a flow exit plate which is mounted on a fixed joint in an articulated manner to comprise first flow exit openings, which advantageously are designed as flow exit openings for producing a diffuse flow. With this, in a first movement condition, the flow exit plate essentially spans the air duct so that an outflow of a purely diffuse airflow occurs. Furthermore, a control plate mounted on both sides in an articulated manner is provided, wherein the one side of the control plate is mounted in an articulated manner to the flow exit plate and the other side of the control plate is mounted in an articulated manner to a linear guide. With this it becomes possible for the control plate on folding up the flow exit plate (i.e. when the flow exit plate no longer spans the exit cross section of the air duct) thus to the release the path for the air flowing from the air duct. At the same time the control plate is to be arranged such that the control plate forms a wall of the air duct so that the air may exclusively flow past the control plate into the vehicle interior without coming into contact with the flow exit plate and its openings having a small area. At the same time it is particularly advantageous if lamellae are provided in the open, angled region which results on folding out the flow exit plate, between which then several second flow exit openings are located (thus more or less instead of a single large flow exit opening). With this, a direction setting of the airflow flowing through the lamellae is given by way of the lamellae. At the same time, the control plate with regard to flow technology, represents a separation between first flow exit openings (small-area holes) and second flow exit openings (openings between the lamellae).

A particularly advantageous embodiment form envisages the first flow exit openings being designed such that by way of increasing the intensity of the airflow, the adjustment means may be moved from a first into a second movement condition. This is due to the fact that the flow resistance through the small-area holes (first flow exit openings) in the first movement condition is very much higher than the flow resistance of the second flow openings. It thus may occur that with an increase in the flow intensity, the flow exit plate is quasi folded up/open and thus the system seeks the condition with the lowest flow resistance (thus the second movement condition). This procedure may of course be furthermore encouraged with regard to design by way of suitably arranged springs.

It is further possible to change the exit direction of the airflow from the second exit openings (thus the openings between the lamellae) by way of the intensity of the airflow. This e.g. is possible in that a separating airflow is separated off from the air duct, which e.g. flows laterally on the lamellae and thus ensures their adjustment. One therefore succeeds in providing an adjustment possibility for the lamellae (without a cost-intensive electric motor requiring maintenance). The intensity of the airflow here serves as the control variable for which the ventilator motor which is present in any case with its [closed loop control] forms the basis. Thus e.g. for the driver travelling on his own, it becomes possible to carry out an adjustment of the lamellae by way of simply upwardly adjusting the ventilator without having to undertake manual measures which would be dangerous when travelling, e.g. at the front-seat passenger side.

In this manner it is furthermore possible to create a so-called reciprocating operation by way of a control means for the temporarily changeable control of the intensity of the airflow, which thus produces a different inclination of the lamellae due to the changes in the flow intensity and thus may ensure a uniform ventilation of the total inner space of the vehicle without expensive servo-motors.

At the same time, the instrument panel of a motor vehicle, essentially in its central upper region, but also in the region of the A-columns, particularly lends itself as a particularly suitable location for a ventilation means according to the invention.

Further advantageous designs of the present invention are specified in the other dependent claims.

Figure 2:
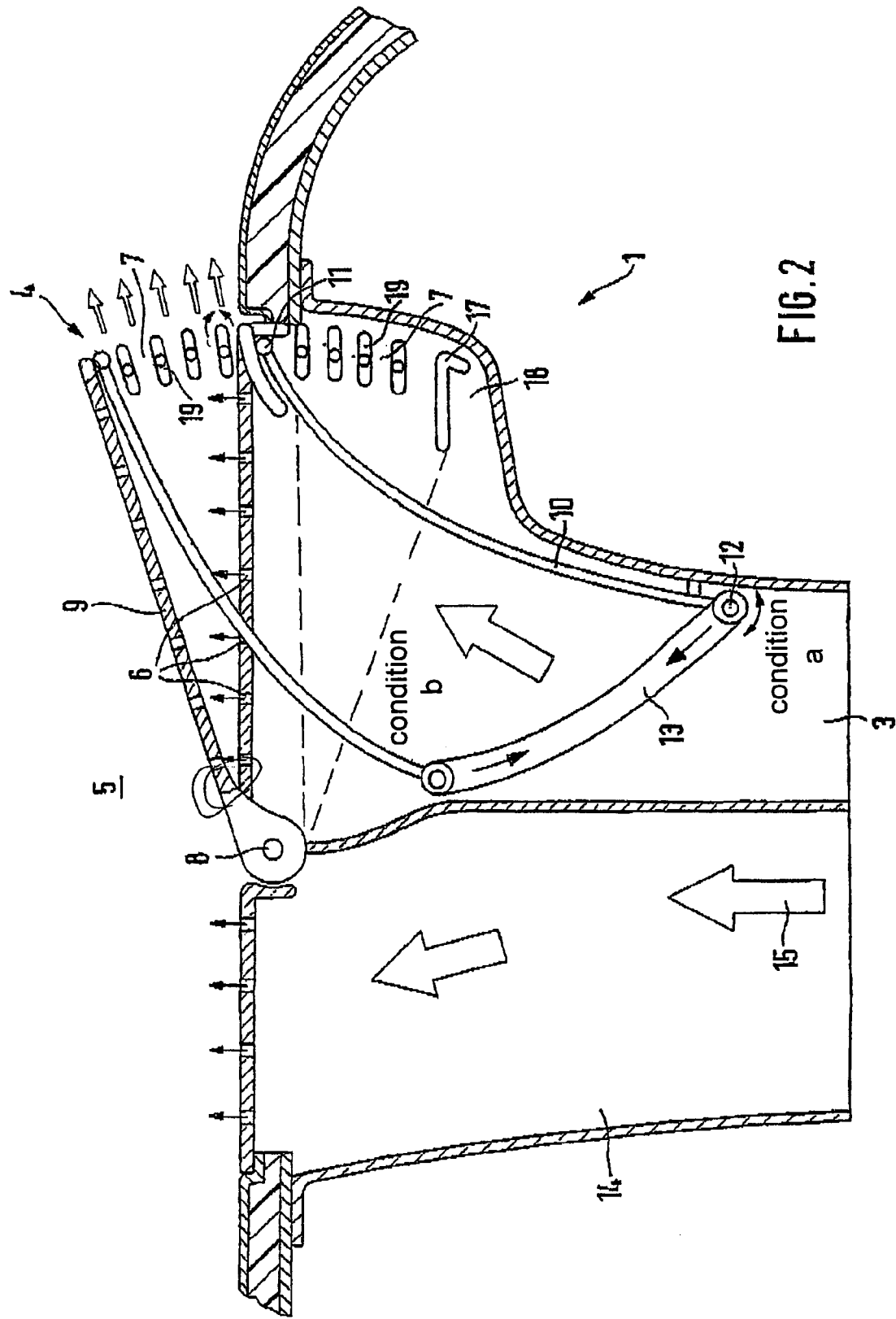

The present invention is now explained by way of several figures. There are shown in:

FIGS. 1a to 1c a sectioned representation of a ventilation means according to the invention, in an instrument panel of a motor vehicle, FIG. 2 the cross section of a ventilation means according to the invention, in detail.

FIG. 1a shows two ventilation means 1 according to the invention, in an instrument panel of a motor vehicle. For an improved overview, only the right half of the instrument panel is shown sectioned. Both ventilation means 1 are located in a folded out condition in which a directed airflow out of lamellae openings is possible.

FIG. 1b shows the folded-in condition (in the following called condition a) for the middle ventilation means, with which a diffuse flow gets into the vehicle interior through small openings in the surface of the flow exit plate 9.

FIG. 1c again shows the folded-out condition of the flow exit plate 9 in detail, with which an exit flow through the lamellae openings directed into the interior is effected (this in the following is indicated as condition b).

FIG. 2 shows the cross section through the ventilation means according to the invention.

On the left half of the picture one may see a separated-off auxiliary air duct 14 through which air in the direction 15 reaches into the vehicle interior through a diffuser. In the following however the ventilation means 1 according to the invention in the right half of the picture is explained. This is part of an instrument panel 2 of a motor vehicle. It comprises an air duct 3 which widens to the top, for leading air from a blower to the interior of a vehicle. Furthermore an adjustment means 4 is provided for controlling air led to the air duct 3.

It is to be noted that two movement conditions of the adjustment device 4 are shown above one another in FIG. 2. This on the one hand is the first movement condition indicated at a, with which the flow exit plate 9 essentially covers or spans the exit cross section of the air duct 2, and on the other hand the second movement condition b, with which the flow exit plate 9 is shown in the folded out condition and no longer spans the exit cross section of the air duct 3.

The adjustment means 4 amongst other things comprises a flow exit plate 9. This comprises first flow exit openings 6 which have a small-area cross section, and with a flow of air in the direction of the vehicle interior, here produce an essentially diffuse airflow. The flow exit plate 9 is mounted in an articulated manner to a fixed joint 8. The flow exit plate 9 furthermore at its side which is distant to the fixed joint 8 (to be seen on the right at the top in condition b) comprises a further joint which connects the flow exit plate 9 to the control plate 10 in an articulated manner. The control plate 10 on its oppositely lying side is again mounted or guided in an articulated manner in a slightly curved linear guide rail 13. In the movement condition b, this joint is located at the top dead centre of the guide rail 13. In the movement condition a, this joint is located at the bottom dead centre of the guide rail 13. The control plate 10 is designed in an essentially airtight manner so that in the movement condition a, the right duct wall is formed by the control plate 10 and thus the airflow flows essentially perpendicularly and diffusely out of the flow exit plate 9.

The flow exit plate 9 furthermore comprises an additional section 17 arranged at an angle which is separated from the first flow exit openings 6 by the control plate 10 and in the movement condition a is located in a dead space 18 of the air duct 3 through which no air flows in this condition.

In the following, the movement condition b is dealt with. With this, as already indicated, the flow exit plate 9 is in its position angled upwards. The section 17 of the flow exit plate 9 projecting at an angle at the same time is located with its lamellae 7 in the region of the opening angle. The control plate 10 ensures that in this second movement condition air only flows out through the second flow exit openings designed as lamella openings. With this, the essentially airtight control plate 10 represents a left limitation wall for the exiting flow. With this flow it is the case of a directed flow, the lamellae 19 are adjustably arranged so that an adjustment of the flow direction into the interior of the vehicle may be effected in various manners.

The first flow exit openings 6 for creating a diffuse flow into the interior of the vehicle effect a very much higher flow resistance on the prior arranged blower of the ventilation means which is not shown here. The adjustment means 4 as a whole is designed such that with a threshold value of the intensity of the airflow, this is moved upwards with its flow exit plate 9 and thus seeks the condition of the smallest possible flow resistance. At the same time it is possible, such as by way of a spring mechanism, to permit a distinct switching from the first into the second movement condition. Furthermore it lies within the framework of the invention to achieve an adjustment of the lamellae 19 and thus a setting of the direction of directed flow through the second flow exit openings 7 by way of further airflows which have not been shown. This may also be effected in the already mentioned reciprocating operation in accordance with the control means according to the invention.

The invention claimed is:

1. A ventilation means for an instrument panel of a motor vehicle or likewise, comprising an air duct for leading in air, with an adjustment means for controlling air led to the air duct, wherein the adjustment means comprises flow exit openings for the flow exit of an airflow into the interior of and vehicle, and wherein the adjustment means is designed such that in a first movement condition of the adjustment means, the airflow directed towards the interior of the vehicle only flows out through first flow exit openings and in a second movement condition only flows out through second flow exit openings, and wherein a flow exit plate which is mounted on a fixed joint in an articulated manner is provided with first flow exit openings and the flow exit plate in the first movement condition spans the exit cross section of the air duct, wherein the flow exit plate at the opposite end of the fixed joint further comprises a joint which connects the flow exit plate to a control plate, the control plate, with regard to flow technology, representing a separation between the first flow exit openings and the second flow exit openings.

2. A ventilation means according to claim 1, wherein the first flow exit means are provided for achieving a diffuse flow and the second flow exit openings are provided for achieving a directed flow.

3. A ventilation means according to claim 1, wherein this comprises a control plate which is mounted on both sides in an articulated manner, wherein one side of the control plate is mounted in an articulated manner on the flow exit plate and the other side is mounted in an articulated manner on a linear guide.

4. A ventilation means according to claim 3, wherein the flow exit plate on the side which is distant to the fixed joint comprises second flow exit openings which are arranged at an angle to the remaining flow exit plate and are located between the lamellae.

5. A ventilation means according to claim 4, wherein first and second flow exit openings are separated by the control plate.

6. A ventilation means according to claim 1, wherein first flow exit openings are designed such that by way of increasing the intensity of the airflow, the adjustment means may be conveyed from the first into the second movement condition.

7. A ventilation means according to claim 1, wherein the exit direction of the airflow out of the second flow exit openings may be changed by way of the intensity of the airflow.

8. A ventilation means according to claim 7, wherein a control means is provided for the temporally changeable control of the intensity of the airflow.

9. A ventilation means according to claim 1, wherein this is arranged on the upper side of an instrument panel of a motor vehicle in an essentially central manner.

* * * * *